(12) United States Patent
Neidhardt

(10) Patent No.: US 11,124,441 B2
(45) Date of Patent: *Sep. 21, 2021

(54) HOLLOW GLASS MICROSPHERES AND METHOD FOR PRODUCING THE SAME

(71) Applicant: DENNERT PORAVER GMBH, Postbauer-Heng (DE)

(72) Inventor: Wolfram Neidhardt, Hilpoltstein (DE)

(73) Assignee: Dennert Poraver GmbH, Postbauer-Heng (DE)

( * ) Notice: Subject to any disclaimer, the term of this patent is extended or adjusted under 35 U.S.C. 154(b) by 219 days.

This patent is subject to a terminal disclaimer.

(21) Appl. No.: 16/181,577

(22) Filed: Nov. 6, 2018

(65) Prior Publication Data

US 2019/0135675 A1    May 9, 2019

(30) Foreign Application Priority Data

Nov. 6, 2017 (DE) .......................... 102017219692.0

(51) Int. Cl.
| C03B 19/10 | (2006.01) |
| C03C 11/00 | (2006.01) |
| C03C 1/00 | (2006.01) |
| C03C 1/02 | (2006.01) |

(52) U.S. Cl.
CPC ............ *C03B 19/107* (2013.01); *C03C 1/002* (2013.01); *C03C 1/02* (2013.01); *C03C 11/002* (2013.01)

(58) Field of Classification Search
None
See application file for complete search history.

(56) References Cited

U.S. PATENT DOCUMENTS

| 3,230,064 A | 1/1966 | Veatchm et al. |
| 4,111,713 A | 9/1978 | Beck |
| 4,308,065 A | 12/1981 | Walls-Muycelo |
| 4,778,502 A | 10/1988 | Garnier et al. |
| 6,171,651 B1 | 1/2001 | Brown |

(Continued)

FOREIGN PATENT DOCUMENTS

| CN | 205501110 U | * 8/2016 | ........... C03B 19/107 |
| CN | 106185981 A | * 12/2016 | |

(Continued)

OTHER PUBLICATIONS

CN205501110U—Machine Translation Performed _ Patents Dialog on Aug. 7, 2020. (Year: 2020).*

(Continued)

*Primary Examiner* — Lisa L Herring
(74) *Attorney, Agent, or Firm* — Laurence A. Greenberg; Werner H. Sterner; Ralph E. Locher

(57) ABSTRACT

A method for producing hollow glass microspheres includes preparing an aqueous suspension of starting materials including finely ground glass and waterglass. Combustible particles are produced from the suspension and are mixed with an AlO(OH)-containing pulverulent release agent. The mixture of combustible particles and release agent is introduced into a combustion chamber of a furnace where it is expanded at a combustion temperature which exceeds the softening temperature of the finely ground glass, to form the hollow microspheres. Hollow glass microspheres produced according to the method are also provided.

28 Claims, 3 Drawing Sheets

(56) References Cited

U.S. PATENT DOCUMENTS

| | | | |
|---|---|---|---|
| 8,951,608 B1 | 2/2015 | Wedding et al. | |
| 2007/0275335 A1 | 11/2007 | Biscan et al. | |
| 2010/0264097 A1* | 10/2010 | Sun | B01J 35/1076 210/767 |
| 2017/0327412 A1* | 11/2017 | Weinberger | C03B 19/08 |
| 2018/0215644 A1* | 8/2018 | Doering | C03C 3/089 |
| 2019/0077693 A1 | 3/2019 | Weinberger et al. | |

FOREIGN PATENT DOCUMENTS

| | | | |
|---|---|---|---|
| DE | 2603534 A1 | 8/1976 | |
| DE | 2842673 A1 | 5/1979 | |
| DE | 69814602 T2 | 3/2004 | |
| DE | 102015201681 A1 * | 8/2016 | C03B 19/107 |
| DE | 102015003398 A1 | 9/2016 | |
| DE | 102016208141 A1 | 11/2017 | |
| WO | 9833748 A1 | 8/1998 | |
| WO | 2017194485 A1 | 11/2017 | |

OTHER PUBLICATIONS

CN205501110U English Translation Performed by Lingualinx Language Solutions, Aug. 2020. (Year: 2020).*

* cited by examiner

HOLLOW GLASS MICROSPHERES AND METHOD FOR PRODUCING THE SAME

CROSS-REFERENCE TO RELATED APPLICATION

This application claims the priority, under 35 U.S.C. § 119, of German Patent Application DE 10 2017 219 692.0, filed Nov. 6, 2017; the prior application is herewith incorporated by reference in its entirety.

BACKGROUND OF THE INVENTION

Field of the Invention

The invention pertains to hollow glass microspheres and to a method for producing them.

Hollow glass microspheres, being hollow, spherical particles having typical diameters in the sub millimeter region (around 1 to 1000 micrometers), are much in use as lightweight aggregates in composite materials and lightweight concrete. Other areas for use of these hollow glass microspheres (HGM) include medicine, the consumer goods industry, and the oil and gas industry. Hollow microspheres are at least substantially in a state of monocellular expansion, meaning that they have a glass wall which is thin (in comparison to the sphere diameter) and which surrounds a single large, central, and spherical cavity (with the diameter of this central cavity being only slightly less than the sphere diameter). The glass wall of a hollow microsphere of this kind may, however, include further cavities (bubbles) with a substantially smaller diameter.

HGM should be distinguished from expanded glass particles, which are likewise frequently employed as lightweight aggregates. Expanded glass particles may likewise have a spherical or spheroidal outer contour, but differ critically from the aforementioned hollow microspheres in their multicellular structure. The volume of expanded glass particles is therefore filled by a foamlike glass matrix which surrounds a multiplicity of cavities, with each of these cavities being small in comparison to the particle size.

Expanded glass particles are customarily produced by expansion of green-particle pellets (or combustible material), formed from finely ground glass, waterglass, and an expandant, in a rotary tube furnace. In order to prevent the fused combustible particles sticking to the furnace wall or to other combustible particles, a release agent is generally introduced into the furnace together with the combustible material. Examples of release agents used include kaolin and finely ground clay.

Hollow glass microspheres and expanded glass particles may in principle be produced from the same or similar starting materials. From a process engineering standpoint, however, the production of hollow glass microspheres is substantially more difficult to manage than the production of expanded glass particles. This is so in particular because, in order to produce hollow microspheres, the green particles have to be melted to a much greater degree than for expanded glass production, so that the bubbles which form at the start of the expansion process unite to form the large central cavity and are therefore able to displace the glass matrix to the outer margin of the sphere.

With the greater melting of the glass matrix, however, there is a considerable increase in the propensity of the particles to stick. Moreover, the risk increases of the melted particles being crushed or abraded away by contact with other particles or with the furnace wall during the expansion process. To date, therefore, it has generally not been possible, or at least not on an industrial scale (production scale), to use rotary tube furnaces in order to produce hollow glass microspheres, despite the fact that the use of rotary tube furnaces would in itself be advantageous, due to their robustness, the high achievable throughput, and the comparatively low cost and effort of their operation. In particular, the tendency of the particles to stick cannot usually be adequately managed by using the conventional release agents.

To date, therefore, hollow glass microspheres have customarily been produced in vertical furnaces (also referred to below as "shaft furnaces"), in which either the green particles are expanded in an upwardly directed flow of hot gas, and then discharged with the gas flow from the upper end of the vertical furnace (in accordance, for example, with U.S. Pat. No. 3,230,064 A), or the green particles are expanded in falling (in accordance, for example, with U.S. Publication No. 2007/0275335 A1).

SUMMARY OF THE INVENTION

It is accordingly an object of the invention to provide hollow glass microspheres and a method for producing the same, which overcome the hereinafore-mentioned disadvantages of the heretofore-known microspheres and methods of this general type and which enable effective production of hollow glass microspheres.

With the foregoing and other objects in view there is provided, in accordance with the invention, a method for producing hollow glass microspheres by:
  preparing an aqueous suspension of starting materials including finely ground glass and waterglass,
  producing combustible particles from the suspension,
  mixing the combustible particles with a pulverulent release agent containing AlO(OH),
  introducing the mixture of combustible particles and release agent into a combustion chamber of a furnace, and
  expanding the combustible particles in the combustion chamber at a combustion temperature which exceeds the softening temperature of the finely ground glass, to form the hollow microspheres.

With the objects of the invention in view, there are also provided hollow glass microspheres having a glass wall surrounding a central cavity, which is obtainable by the method described above.

According to the method, for the production of hollow glass microspheres, an aqueous suspension is prepared of starting materials including finely ground glass and waterglass, this suspension being referred to below as "starting suspension". The starting suspension is optionally admixed with an expandant (also referred to as "blowing agent"; e.g., soda niter or sugar). From the starting suspension, combustible particles ("green particles") are produced, with diameters of preferably between 1 micrometer and 700 micrometers, more particularly between 20 micrometers and 200 micrometers. The lower limit of the above range figures refers in this case, for example, to the $d_{10}$ of the respective particle size distribution. The upper limit refers, for example, to the $d_{90}$ of the respective particle size distribution. The "$d_x$" (where x=10, 50, 90, etc.) of the particle size indication, in this case and hereinafter, means that x % of the particles have a size of not more than $d_x$. For example, then, the $d_{50}$ indicates the mean particle size in respect of which 50% of the particles are smaller. The combustible particles are mixed with a pulverulent release agent, after which the mixture of combustible particles and release agent is introduced into a combustion chamber of a furnace.

In the combustion chamber, where the prevailing combustion temperature exceeds the softening temperature of the finely ground glass, the combustible particles, finally, undergo expansion to form the hollow microspheres. In this case, in a typical manifestation of the method, the combustible particles undergo an increase in their diameter, or expansion, of 25% to 70%. In total, the diameter of the hollow microspheres resulting from the expansion process, in typical sizing, is between around 2 micrometers and 1000 micrometers, preferably between 7 micrometers and 600 micrometers.

Employed in accordance with the invention is a release agent which includes aluminum oxide hydroxide, AlO(OH) (CAS No.: 1318-23-6). This compound, which is also referred to as "aluminum metahydroxide", is employed in this case in particular in the γ-AlO(OH) variant, which corresponds to the mineral boehmite.

The invention is based on extensive experiments by the applicant which have shown that by using AlO(OH) as release agent, the sticking tendency of the green particles and also of the hollow microspheres formed from them can be suppressed in a particularly effective way, so making it possible in particular for the hollow microspheres to be produced in industrial rotary tube furnaces (in other words on the production scale) with sufficient effectiveness.

In one suitable embodiment of the invention, the release agent is formed exclusively—apart from commonplace impurities in the order of magnitude of up to at most 1 to 2 wt %—of AlO(OH). Preferably, however, the release agent, as well as AlO(OH), also includes aluminum hydroxide (Al(OH)$_3$; CAS No.: 21645-51-2, also called "aluminum orthohydroxide"). Particularly good results with regard to the quality of the hollow microspheres, and more particularly a high sphericity and low bulk density, have been achieved in advantageous embodiments of the invention employing, as release agent, a mixture which is formed exclusively—again, apart from commonplace impurities in the order of magnitude of at most 1-2 wt %—of AlO(OH) and Al(OH)$_3$.

In advantageous embodiments of the mixed release agent, the fractions of AlO(OH) and Al(OH)$_3$ are selected preferably in such a way, that the fraction of Al(OH)$_3$ in the mixture of combustible particles and release agent is between 6 wt % and 30 wt %, preferably between 8 wt % and 25 wt %, and that the fraction of AlO(OH) in the mixture of combustible particles and release agent is between 1 wt % and 25 wt %, preferably between 2 wt % and 12 wt %, more particularly between 4 wt % and 10 wt %.

In another advantageous embodiment of the invention, the release agent, as well as AlO(OH) and Al(OH)$_3$, also includes dehydroxylated kaolin, more particularly in a fraction which is between 3 wt % and 10 wt %, preferably between 4 wt % and 7 wt %, of the overall mixture of combustible particles and release agent. In this case the release agent used preferably includes a three-component mixture containing only—again, apart from commonplace impurities in the order of magnitude of at most 1-2 wt %—AlO(OH), Al(OH)$_3$ and dehydroxylated kaolin. The term "dehydroxylated kaolin" is used as a generic term, embracing metakaolin and calcined (anhydrous) kaolin. Metakaolin is customarily produced by heating kaolin to temperatures between 650° C. and 750° C. Calcined (anhydrous) kaolin is obtained by heating kaolin to temperatures above 900° C.—see, for example, EP 1 715 009 A2.

Embodiments of the method that have proven particularly useful are those in which the Al(OH)$_3$ fraction selected in the release agent is coarser than the AlO(OH) fraction.

In a useful development of the invention, the AlO(OH) used for the release agent is selected or conditioned in such a way that at least 90% of the AlO(OH) particles in the release agent have a particle diameter of less than 1 micrometer ($d_{90}$=1 µm), preferably less than 0.7 micrometer ($d_{90}$=0.7 µm). Having been found experimentally to be particularly suitable, and hence also preferred, in this case is a product which contains 99.7% AlO(OH) in a particle size distribution of $d_{10}$=0.2 µm, $d_{50}$=0.35 µm and $d_{90}$=0.6 µm.

In a useful development of the invention, the Al(OH)$_3$ used optionally for the release agent is selected or conditioned in such a way that at least 90% of the Al(OH)$_3$ particles in the release agent have a particle diameter of less than 4 micrometers ($d_{90}$=4 µm), preferably less than 3.5 micrometers ($d_{90}$=3.5 µm). Having been found experimentally to be particularly suitable, and therefore also preferred, in this case is a product containing 99.5% Al(OH)$_3$ in a particle size distribution of $d_{10}$=0.6 µm, $d_{50}$=1.3 µm and $d_{90}$=3.2 µm.

In a useful development of the invention, the dehydroxylated kaolin used optionally for the release agent is selected or conditioned in such a way that at least 90% of the dehydroxylated kaolin particles in the release agent have a particle diameter of less than 5 micrometers, preferably less than 4 micrometers. Having been found experimentally to be particularly suitable, and therefore also preferred, in this case are products in which the dehydroxylated kaolin particles have a mean particle size of 3 µm.

The combustible particles are produced preferably by spray granulation. Alternatively, the combustible particles are produced by granulation in an intensive mixer, more particularly in an Eirich intensive mixer.

In one useful embodiment of the method, the combustible particles, before being fed to the combustion chamber, are mixed with the pulverulent release agent in an intensive mixer. This mixing in the intensive mixer produces a particularly dense and homogeneous distribution of the release agent on the surface of the combustible particles, and therefore—in comparison to other kinds of mixing of combustible particles and release agent—allows a saving to be made in release agent, without any need to accept an increase in agglomeration during the combustion process.

An intensive mixer is a mixer in which the mixing procedure is carried out at a power input of at least about 2 kilowatts per 100 kilograms of mixture, or one whose mixing tool in the mixing procedure moves at a peripheral velocity of at least 15 meters per second relative to the mixing vessel. The intensive mixer used in accordance with the invention preferably features a power input of at least 5 kilowatts per 100 kilograms of mixture, more particularly at least 10 kilowatts per 100 kilograms. One preferred embodiment uses an Eirich intensive mixer to mix the combustible particles with the release agent. Within the context of the invention, however, it is also possible in principle to carry out the method using a "horizontal" Lodige plowshare mixer or with an Ekato mixer, which is characterized by a conical mixing vessel. Before being introduced into the combustion chamber, the mix of combustible particles and release agent is preferably mixed intensively for a mixing time of 1 to 10 minutes, more particularly for around 2 to 5 minutes.

The furnace employed for the expansion process is preferably a rotary tube furnace. Employed more particularly in this case is a rotary tube furnace which is heated directly (that is, from the inside) by flaming, and which, due to its rational mode of operation and of the high combustion temperatures (which are comparatively easy to attain) is advantageous for the production of hollow glass microspheres. A decisive step forward in this case is that with the method of the invention it is possible to utilize the advantages of the directly heated rotary tube furnace without any overheating of the combustible particles and of the hollow microspheres formed from them. An alternative to this is to use a rotary tube furnace heated indirectly (again, preferably, by flaming). In the latter case, the supply of heat into the combustion chamber is accomplished from outside through the outer surface of the rotary tube. A further alternative within the method of the invention is to use a shaft furnace (vertical furnace), in which the combustible particles are expanded in an ascending stream of hot gas. In this variant method as well, the use of the release agent of the invention has been found to result in a substantial reduction in the sticking tendency, and to make an advantageous contribution to the formation of the hollow spheres.

The combustion process is carried out preferably at a combustion temperature of between 800° C. and 1150° C., preferably between 850° C. and 1000° C. An advantage of the AlO(OH)-containing release agent of the invention over other release agents in this case is that a comparatively high combustion temperature can be set, without any agglomeration (or at any rate without substantial agglomeration) of the combustible particles.

One special embodiment of the invention are the hollow glass microspheres obtainable by the above-described method of the invention. Analysis has shown that with this method, during the expansion process, aluminum oxide from the release agent becomes integrated in the melted glass wall of the hollow microspheres. As a result of this, the glass wall has a two-phase construction. While an inner region of the glass wall is formed of a lime-soda-silicate glass of low aluminum content, the aluminum fraction in an outer layer of the glass wall is markedly increased. The outer layer has a thickness, for example, of approximately 1 micrometer, and thus generally has a lower radial extent than the inner region of the glass wall. As a result of the increased aluminum fraction in the outer layer of the glass wall, the chemical stability of the glass wall is increased significantly by comparison with the lime-soda-silicate glass of the inner region.

Another embodiment of the invention is the use of a release agent which includes AlO(OH), preferably in a mixture with $Al(OH)_3$ and also, optionally, with dehydroxylated kaolin, in the production of hollow glass microspheres.

Other features which are considered as characteristic for the invention are set forth in the appended claims.

Although the invention is illustrated and described herein as embodied in hollow glass microspheres and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
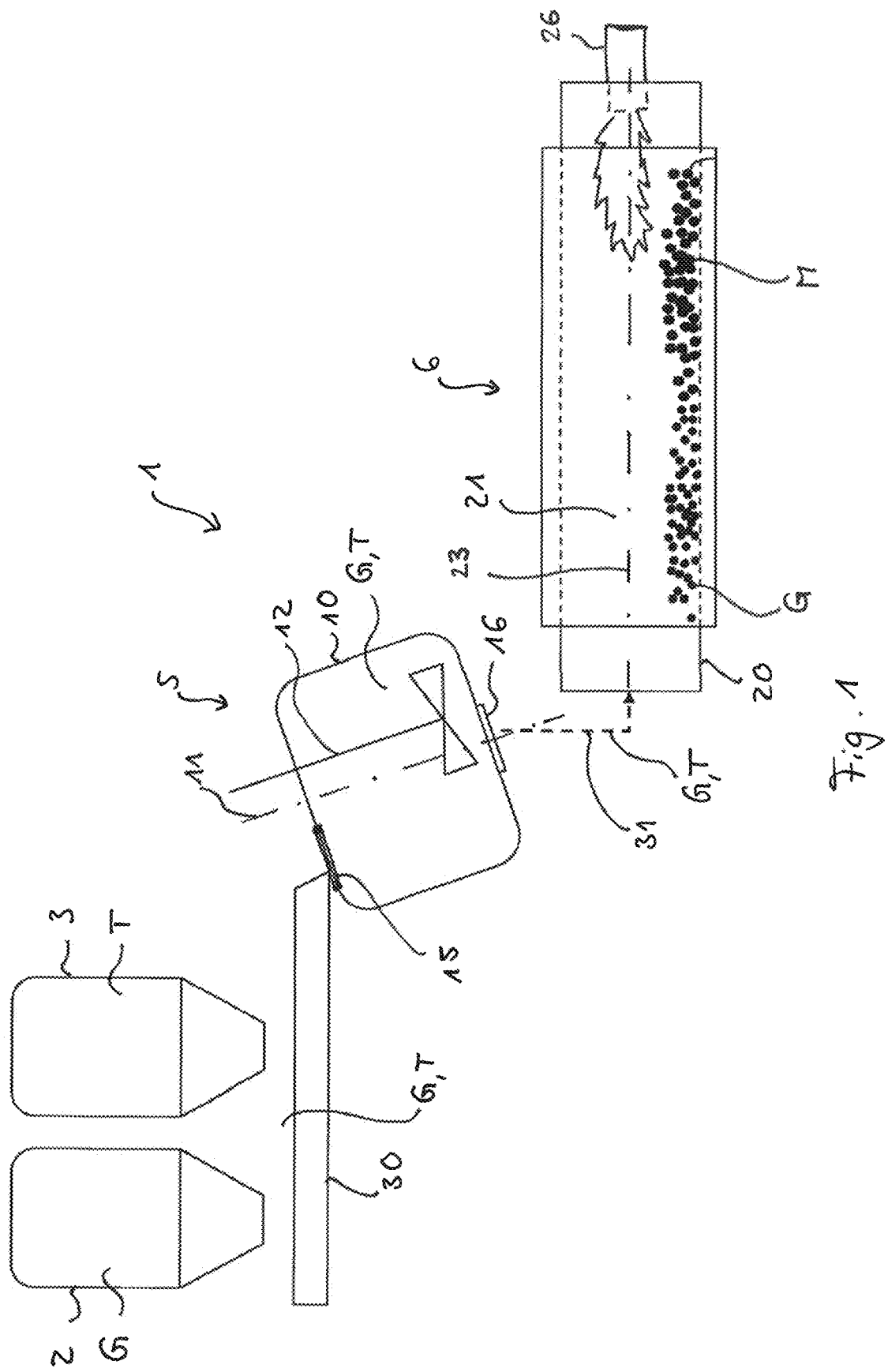
FIG. 1 is a greatly diagrammatically simplified representation of a plant for producing hollow glass microspheres, having a mixer for mixing combustible particles with a pulverulent release agent composed of AlO(OH), optionally in a mixture with $Al(OH)_3$ and optionally dehydroxylated kaolin, and also having a combustion furnace, implemented as a rotary tube furnace, into which the mixture of combustible particles and release agent is introduced, so that the combustible particles are expanded to form the desired hollow microspheres.

Referring now in detail to the figures of the drawings, in which structures and parts that correspond to one another are provided consistently with the same reference symbols, and first, particularly, to FIG. 1 thereof, there is seen a plant 1 for producing hollow glass microspheres M, i.e., for producing hollow glass spheres having typical diameters which are predominantly, for example, in a range of between 40 and 350 micrometers.

The plant 1 includes a first silo 2 as reservoir vessel for combustible particles G, and also a second silo 3 as a reservoir vessel for pulverulent release agent T. Additionally, the plant 1 includes a mixer 5 for mixing the combustible particles G with the release agent T, and also a combustion furnace, implemented as rotary tube furnace 6, for expanding the combustion particles G to form the desired hollow microspheres M.

The combustible particles G stored in the first silo 2 are approximately spherical particles whose diameters are, for example, approximately in the range between 20 micrometers and 200 micrometers. The combustible particles G are produced preferably by spray granulation. Starting materials for that process, including finely ground glass, waterglass, and an expander (e.g., soda niter, sugar, or glycerol), are used to prepare a highly mobile suspension (slip) with water, and this suspension is sprayed in a spraying tower in order to form the combustible particles G. The combustible particles G are subsequently dried. Drying is followed optionally by classifying, where the fraction having the desired diameters is selected and supplied to the silo 2.

In the embodiment of the plant 1 that is shown, the mixer 5 is implemented as an Eirich intensive mixer. The mixer 5 in this case includes a substantially cup-shaped mixing vessel 10, which is mounted rotatably about its longitudinal axis 11, which is inclined relative to the vertical. A mixing tool 12, which is rotatable counter to the mixing vessel 10, is disposed eccentrically in the mixing vessel 10, in parallel to the longitudinal axis 11. The mixing vessel 10 can be charged by way of a closable lid opening 15 and can be emptied through a likewise closable and centrally disposed base opening 16. In exemplary sizing, the mixer 5 in this embodiment has a power input of 10 to 20 kilowatts per 100 kg mixture (preferably about 15 kilowatts per 100 kg mixture) and a peripheral velocity at the outermost point of the stirring tool of at least 30 meters per second. In alternative embodiments, however, the plant 1 may also include a different kind of mixer, such as a drum mixer, for example.

The rotary tube furnace 6 conventionally includes an elongated, hollow-cylindrical rotary tube 20 made from steel which is resistant to high temperatures, with a combustion chamber 21 formed in the interior of the tube. The rotary tube 20 is mounted rotatably about its longitudinal axis 23, which is disposed with a slight incline relative to the horizontal. As shown, the rotary tube furnace is constructed as a directly heated rotary tube furnace. The combustion chamber 21 in this case is fired directly with a gas-operated burner 26, which is disposed at the output end of the rotary tube 20.

In the operation of the plant 1, combustible particles G and release agent T are metered from the two silos 2, 3 onto a mixing chute 30 which is disposed beneath the silos 2, 3, so that at that point there is a premix composed of combustible particles G and release agent T, with a specified release agent fraction. The desired mass ratio is set by using a balance, for example. Alternatively, the setting is performed volumetrically, by using conveying screws or star wheels assigned to the silos 2, 3, for example. Via the mixing chute 30, the premix of combustible particles G and release agent T is conveyed into the mixing vessel 10 of the mixer 5.

Alternatively to the exemplary representation, there may also be no mixing chute 30, in which case combustible particles G and release agent T are each metered separately into the mixer 5, so that the desired mixing ratio is generated there.

The mixing procedure takes place batchwise, with one batch of the premix being subjected to a mixing procedure in each case. The premix of release agent T and combustible particles G is homogenized in the mixer 5 for a mixing time of 1 to 10 minutes. After the end of the mixing procedure, the mixture of combustible particles G and release agent T is discharged from the mixing vessel 10 through the base opening 16. The mixture is optionally stored in a buffer vessel (not shown explicitly) which is placed between the mixer 5 and the rotary tube furnace 6.

From the mixing chute 30 or the optional downstream buffer vessel, the mixture of combustible particles G and release agent T is supplied continuously, by using a charging facility which is not shown explicitly herein, to the combustion chamber 21 of the rotary tube furnace 6 (indicated by an arrow 31). In the combustion chamber 21, in the operation of the plant 1, the burner 26 is used to generate a specified combustion temperature, at which the combustible particles G undergo successive expansion to form the desired hollow microspheres M within a period of around 1 to 15 minutes.

The hollow microspheres M produced are discharged from the combustion chamber 21 and, after a cooling and sorting step, are supplied to a product reservoir (not shown herein). The release agent T is separated from the hollow microspheres M by sieving or pneumatic classifying. Optionally, again by sieving or pneumatic classifying, the hollow microspheres M are separated from particles which have undergo multicellular (foamlike) expansion (that is, particles having a plurality of large cavities), which may be formed during the combustion process alongside the hollow microspheres M. These multicellularly expanded particles are either discarded as rejects or supplied for an alternative use.

Figure 2:
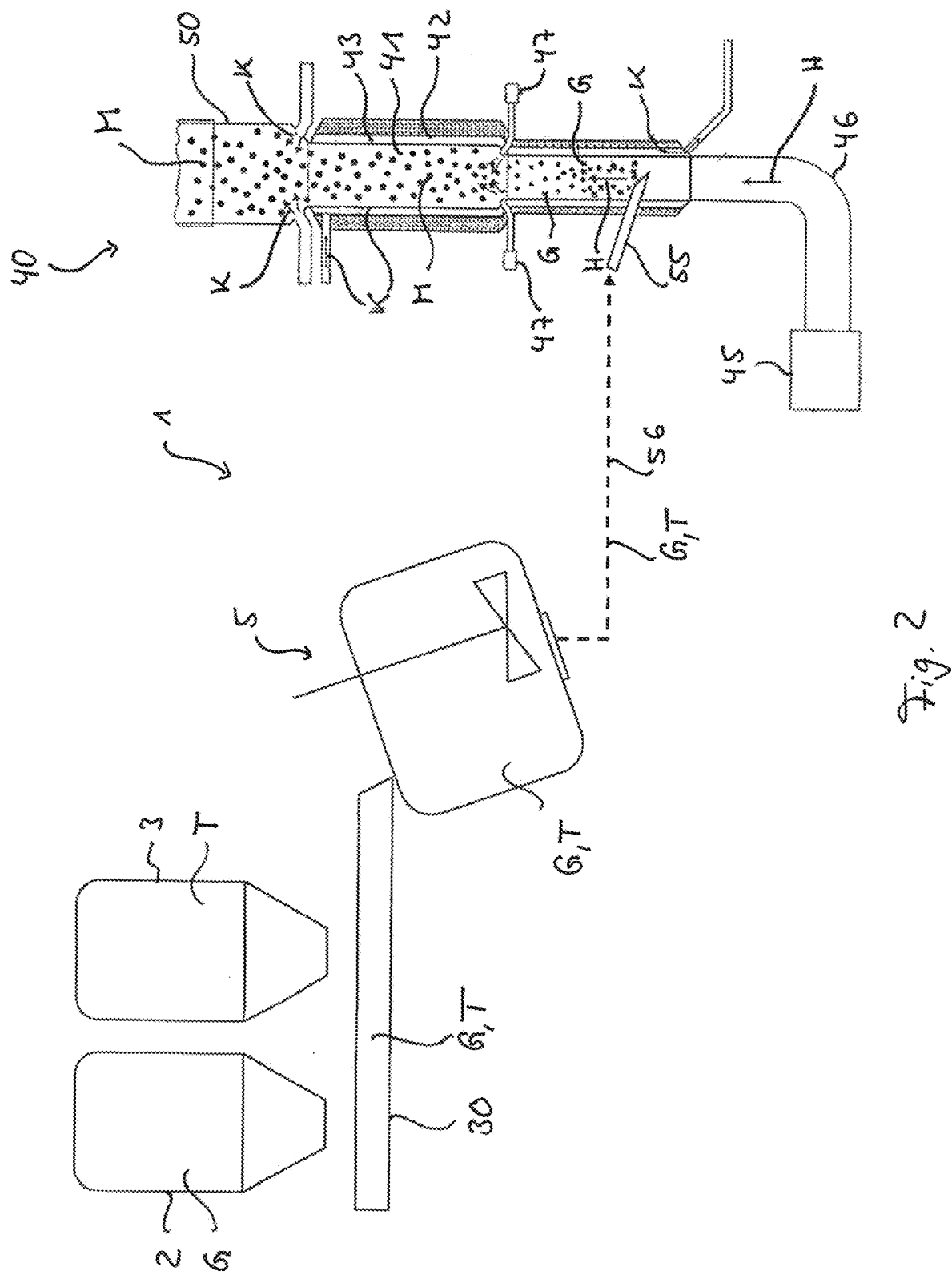
FIG. 2 is a representation in accordance with FIG. 1 which shows an alternative embodiment of the plant, in which the combustion furnace is implemented as a shaft furnace.

FIG. 2 shows an alternative embodiment of the plant 1. In contrast to the first embodiment, the expansion process in this case is carried out not in a rotary tube furnace but instead in a shaft furnace 40.

The shaft furnace 40 includes a combustion chamber 41 which is extended in the manner of a shaft and aligned vertically with respect to the longitudinal extent, this chamber 41 being surrounded by a double jacket 42 of steel that is insulated thermally with respect to the outside. Cooling air K is guided in a cooling gap 43 which is formed by the double jacket 42. Toward the top, the combustion chamber 41 is widened in a steplike manner.

Assigned to the shaft furnace 40 is a gas-operated burner 45, which is used to generate a hot gas stream H, within the combustion chamber 41, that is directed from bottom to top. For this purpose, the hot gas generated by the burner 45 is supplied through a hot gas line 46 to the combustion chamber 41 as hot gas stream H. At approximately half the height of the combustion chamber 41, specifically in the region of the above-described cross-sectional widening, there are a number (six, for example) of additional gas-operated burners 47, which are positioned in a crownlike distribution around the periphery of the combustion chamber 41.

Adjoining the combustion chamber 41 at the top, according to FIG. 2, is a region which serves as a cold trap 50 and which has a cross section widened further relative to the cross section of the upper portion of the combustion chamber 41. Alternatively, the combustion chamber 41 and also the optional cold trap 50 may be implemented with a uniform cross section over the whole of their height.

The shaft furnace 40, finally, includes a charging facility, formed in this case by a combustibles line 55. The combustibles line 55 is passed through the double jacket 42 and opens into the lower portion of the combustion chamber 41. The combustibles line 55 is fed from the mixer 5 or from an optionally downstream buffer vessel (indicated by the arrow 56). The combustibles line 55 runs in particular with a descent in the charging direction, so that without active conveying (merely under the action of gravity) the combustible material slides into the combustion chamber 41. Optionally, however, the charging facility may also include a device for the active conveying of the combustible material—for example, a compressed air system or a conveying screw.

In the operation of the plant 1, in the exemplary embodiment above, the homogeneous mixture of combustible particles G and release agent T is conveyed continuously by using the combustibles line 55 into the combustion chamber 41, where it is captured by the hot gas stream H and carried upward.

In the lower portion of the combustion chamber 41, a temperature is generated of around 650° C., for example, at which the combustible particles G are first of all preheated. The combustion chamber 41 is additionally heated by the burners 47, and so the temperature in the upper portion of the combustion chamber 41 is increased to the combustion temperature which exceeds the softening temperature of the finely ground glass. The expansion of the combustible particles G to form the hollow microspheres M takes place in this case in brief flame contact at approximately 1400° C.

The expanded hollow microspheres M are supplied, finally, to the cold trap 50, where they are quenched by supply of cooling air K. Finally, the hollow microspheres M are isolated from the hot gas stream through a solids separator, and, optionally after a sorting step, they are supplied to a product reservoir (again not shown herein). The entrained release agent T and also, optionally, any rejects (especially multicellularly expanded particles) are separated in turn from the hollow microspheres M by using a cyclone.

INVENTIVE EXAMPLE 1

91 wt % of finely ground used glass (d97≈50 μm), 7 wt % of waterglass and 2 wt % of soda niter were admixed with water to produce a highly mobile slip, which was subsequently granulated in a spraying tower. For the present example, the fine particle fraction of the sprayed granules was employed, this fraction being discharged from the spraying tower with the air stream and deposited in a downstream cyclone. The combustible particles thus obtained have a particle size distribution of $d_{10}$≈30 μm, $d_{50}$≈80 μm and $d_{90}$≈175 μm.

The dried combustible particles were mixed for five minutes in an Eirich intensive mixer with the release agent, composed in this case of AlO(OH) (particle size distribution: $d_{10}$=0.2 μm; $d_{50}$=0.35 μm; $d_{90}$=0.6 μm; purity: 99.7%) in the following proportions:
- 83.3 wt % combustible particles
- 16.7 wt % release agent (AlO(OH))

This mixture was subsequently expanded in an indirectly heated rotary tube furnace (pilot scale). In this and all the experiments described below, the combustion temperature was varied during the progress of the experiment, until hollow microspheres were produced (at the combustion temperatures stated; in the case of inventive example 1, at a combustion temperature of 960° C.).

This experiment produced hollow microspheres which in part, however, had an non-round shape.

INVENTIVE EXAMPLE 2

The combustible particles produced in the same way as for inventive example 1 were again mixed for five minutes in an Eirich mixer with the release agent, which in this case was formed of AlO(OH) (as in inventive example 1) and Al(OH)$_3$ (particle size distribution: $d_{10}$=0.6 μm; $d_{50}$=1.3 μm; $d_{90}$=3.2 μm; purity: 99.5%) in the following proportions:
- 83.3 wt % combustible particles
- 16.7 wt % release agent (8.35 wt % AlO(OH) and 8.35 wt % Al(OH)$_3$)

This mixture was expanded in the same way as for inventive example 1 in the indirectly heated rotary tube furnace (pilot scale) at a combustion temperature of 960° C.

This experiment produced hollow microspheres which overall had a rounder shape than the hollow microspheres from inventive example 1. Moreover, the hollow sphere walls visually had a more homogeneous ("more strongly vitrified") structure. In this experiment as well, however, particles with an unround form were visible. Moreover, alongside individual hollow microspheres, there were also agglomerates.

INVENTIVE EXAMPLE 3

The combustible particles produced in the same way as for inventive example 1 were mixed in this case for 20 minutes in a drum mixer with the release agent, which in this case was formed of AlO(OH) (as in inventive example 1) and Al(OH)$_3$ (as in inventive example 2), in the following proportions:
- 70 wt % combustible particles
- 30 wt % release agent (15 wt % AlO(OH) and also 15 wt % Al(OH)$_3$)

In contrast to inventive examples 1 and 2, this mixture was expanded in a directly heated industrial rotary tube furnace (production scale) at a combustion temperature of 926° C.

This experiment produced hollow microspheres having good sphericity and a visually approximately homogeneous ("vitrified") hollow sphere wall. There were no agglomerates.

INVENTIVE EXAMPLE 4

The combustible particles produced in the same way as for inventive example 1 were mixed in this case in analogy to inventive example 3 for 20 minutes in the drum mixer with the release agent, which in this case was formed of AlO(OH) (as in inventive example 1) and Al(OH)$_3$ (as in inventive example 2), in the following proportions:
- 77 wt % combustible particles
- 23 wt % release agent (8 wt % AlO(OH) and also 15 wt % Al(OH)$_3$)

In the same way as for inventive example 3, this mixture was expanded in the directly heated rotary tube furnace (production scale) at a combustion temperature of 882° C.

This experiment likewise produced hollow microspheres having good sphericity and a visually approximately homogeneous ("vitrified") hollow sphere wall. There were only sporadic agglomerates.

INVENTIVE EXAMPLE 5

The combustible particles produced in the same way as for inventive example 1 were mixed in this case for 5 minutes in the Eirich mixer with the release agent, which in this case was formed of AlO(OH) (as in inventive example 1) and Al(OH)$_3$ (as in inventive example 2), in the following proportions:
- 81.1 wt % combustible particles
- 18.9 wt % release agent (4.7 wt % AlO(OH) and also 14.2 wt % Al(OH)$_3$)

In the same way as for inventive example 1, this mixture was expanded in the indirectly heated rotary tube furnace (pilot scale) at a combustion temperature of 960-990° C.

This experiment likewise produced hollow microspheres having good sphericity and a visually approximately homogeneous ("vitrified") hollow sphere wall. In spite of the increase in the combustion temperature to 990° C., there were only a few agglomerates.

INVENTIVE EXAMPLE 6

The combustible particles produced in the same way as for inventive example 1 were in this case mixed for five minutes in the Eirich mixer with the release agent, which in this case was formed of AlO(OH) (as in inventive example 1), Al(OH)$_3$ (as in inventive example 2), and calcined kaolin (particle size distribution: $d_{10}$=1 μm; $d_{50}$=2 μm; $d_{90}$=10 μm), in the following proportions:
- 70 wt % combustible particles
- 30 wt % release agent (6 wt % AlO(OH) and also 19 wt % Al(OH)$_3$ and also 5 wt % calcined kaolin)

In the same way as for inventive example 3, this mixture was expanded in the directly heated rotary tube furnace (production scale) at a combustion temperature of 828° C.

This experiment likewise produced hollow microspheres of high quality.

COMPARATIVE EXAMPLE 1

The combustible particles produced in the same way as for inventive example 1 were in this case mixed for 5 minutes in the Eirich mixer with the release agent, which in this case was formed of fine-particle $Al(OH)_3$ (particle size distribution: $d_{10}=0.3$ μm; $d_{50}=0.4$ μm; $d_{90}=0.8$ μm; purity: 99.3%), in the following proportions:

88.9 wt % combustible particles
11.1 wt % release agent $(Al(OH)_3)$

This mixture was expanded in an indirectly heated rotary tube furnace (pilot scale) at a combustion temperature of 846-970° C.

This experiment produced almost exclusively agglomerates.

COMPARATIVE EXAMPLE 2

The combustible particles produced in the same way as for inventive example 1 were mixed in this case for 5 minutes in the Eirich mixer with the release agent, which in this case was formed of $Al(OH)_3$ (as in inventive example 2), in the following proportions:

75 wt % combustible particles
25 wt % release agent $(Al(OH)_3)$

In the same way as for inventive example 3, this mixture was expanded in the directly heated rotary tube furnace (production scale) at a combustion temperature of 720° C.

In this experiment it was not possible to obtain any satisfactory product quality. Besides hollow microspheres, the expanded material included a high fraction of rejects (particles having undergone multicell expansion).

COMPARATIVE EXAMPLE 3

The combustible particles produced in the same way as for inventive example 1 were mixed in this case for 5 minutes in the Eirich mixer with the release agent, which in this case was formed of $Al(OH)_3$ (as in inventive example 2), in the following proportions:

76 wt % combustible particles
24 wt % release agent $(Al(OH)_3)$

In the same way as for inventive example 3, this mixture was expanded in the directly heated rotary tube furnace (production scale) at a combustion temperature of 800° C.

In this experiment, it was not possible to maintain stable production of hollow microspheres. After initial production of high-quality hollow microspheres, there were increasingly agglomerates and reject particles (particles having undergone multicell expansion).

COMPARATIVE EXAMPLE 4

The combustible particles produced in the same way as for inventive example 1 were mixed in this case for 5 minutes in the Eirich mixer with the release agent, which in this case was formed of metakaolin, in the following proportions:

75 wt % combustible particles
25 wt % release agent (metakaolin)

In the same way as for inventive example 3, this mixture was expanded in the directly heated rotary tube furnace (production scale) at a combustion temperature of 862° C. to 930° C.

The product resulting from this experiment was formed almost exclusively of particles having undergone multicellular expansion. No agglomerates were observed.

Analysis of Hollow Microspheres from Inventive Example 5

Figure 3:
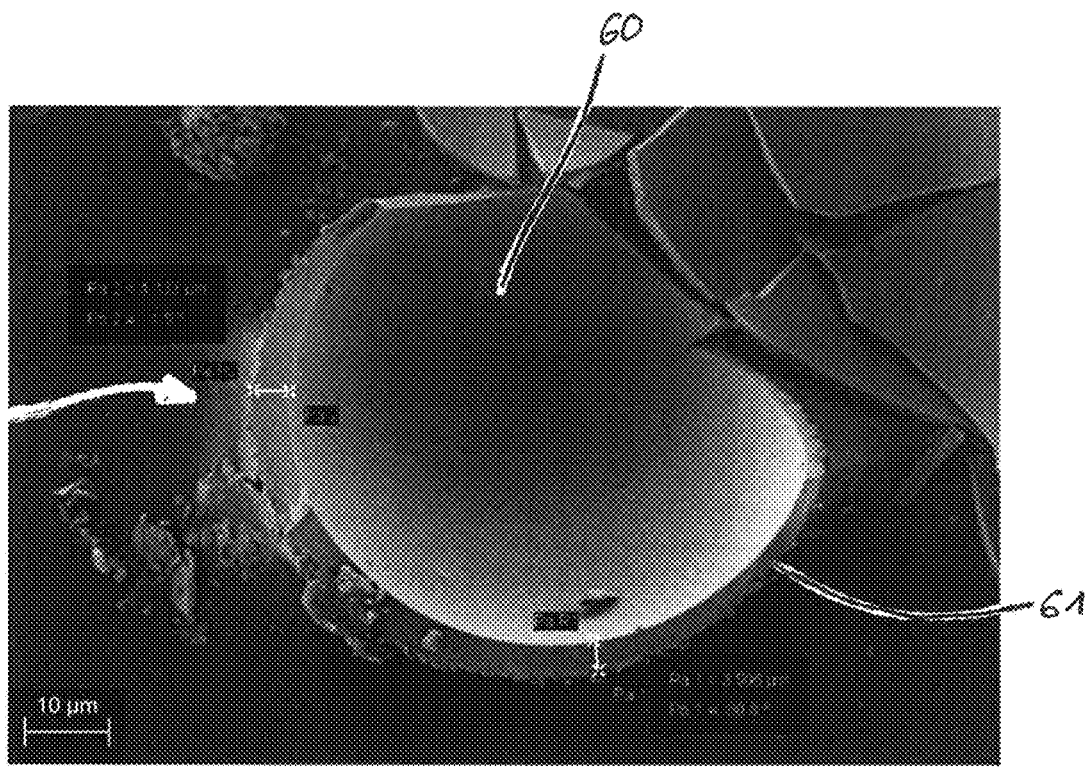
FIG. 3 is a scanning electron micrograph of a hollow glass microsphere produced in accordance with the invention, in a broken-open state.
Figure 4:
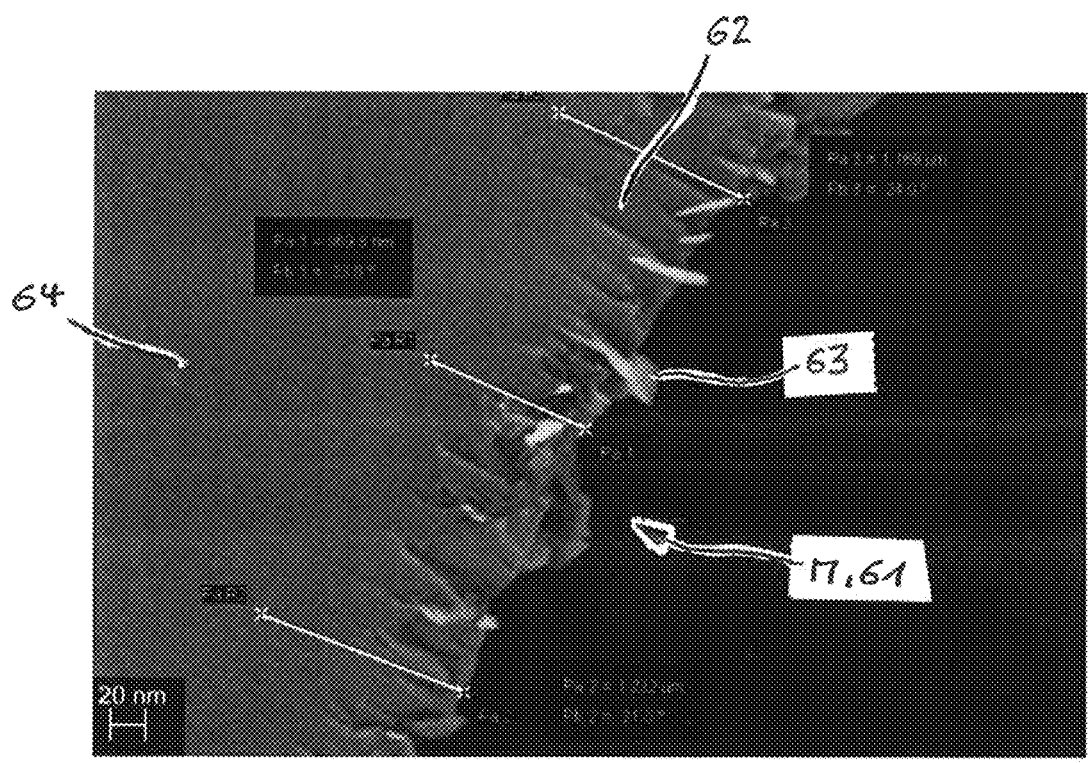
FIG. 4 is a scanning electron micrograph, at greater magnification than FIG. 3, of the broken-open glass wall of a hollow microsphere produced in accordance with the invention.

FIGS. 3 and 4 show scanning electron micrographs of broken-open hollow microspheres M, produced in the experiment described in the form of inventive example 5.

From FIG. 3 it is apparent that the hollow microspheres M depicted herein, with a diameter of around 70 micrometers, are formed by a single, central and spherical cavity 60, surrounded by a thin glass wall 61 with a thickness of around 2 to 5 micrometers. From FIGS. 3 and 4 it is apparent that aluminum oxide particles 63 are fused within a radially outer layer 62 of the glass wall 61, whose radial extent is around 1 micrometer. The glass wall 61 in this case has a two-phase construction, which is also evident in the micrograph of FIG. 4, with this two-phase construction delimiting the outer layer 62 from a remaining inner region 64 of the glass wall 61.

Through energy-dispersive x-ray spectroscopy (EDX) on the hollow microspheres M it was possible to demonstrate that the two-phase construction of the wall material, evident under the scanning electron microscope, is combined with a gradient in the chemical composition of the wall material, reflected in particular in the aluminum content. Whereas a chemical composition measured in the inner region 64 of the glass wall 61 was typical of a lime-soda glass, with an aluminum content of 1.16 wt %, the EDX measurement for the aluminum content of the outer layer 62 produced an estimate of around 14 wt %.

The following is a summary list of reference numerals and the corresponding structure used in the above description of the invention:

LIST OF REFERENCE SYMBOLS

1 plant
2 silo
3 silo
5 mixer
6 rotary tube furnace
10 mixing vessel
11 longitudinal axis
12 mixing tool
15 lid opening
16 base opening
20 rotary tube
21 combustion chamber
23 longitudinal axis
25 cladding
26 burner
30 mixing chute
31 arrow
40 shaft furnace
41 combustion chamber
42 jacket
43 cooling gap
45 burner
46 hot gas line
47 burner
50 cold trap
55 combustibles line
56 arrow
60 cavity
61 glass wall
62 (outer) layer
63 aluminum oxide particles
64 (inner) region
G combustible particles
H hot gas stream
K cooling air
M hollow microspheres
T release agent

The invention claimed is:

1. A method for producing hollow glass microspheres, the method comprising the following steps:
   preparing an aqueous suspension of starting materials including ground glass and waterglass;
   producing combustible particles from the aqueous suspension;
   mixing the combustible particles with a pulverulent release agent containing AlO(OH);
   introducing the mixture of combustible particles and pulverulent release agent into a combustion chamber of a furnace; and
   expanding the combustible particles in the combustion chamber at a combustion temperature exceeding a softening temperature of the ground glass, to form the hollow microspheres.

2. The method according to claim 1, wherein the pulverulent release agent further comprises $Al(OH)_3$.

3. The method according to claim 2, wherein:
   a fraction of $Al(OH)_3$ in the mixture of combustible particles and pulverulent release agent is between 6 wt % and 30 wt %; and
   a fraction of AlO(OH) in the mixture of combustible particles and pulverulent release agent is between 1 wt % and 25 wt %.

4. The method according to claim 2, wherein:
   a fraction of $Al(OH)_3$ in the mixture of combustible particles and pulverulent release agent is between 8 wt % and 25 wt %; and
   a fraction of AlO(OH) in the mixture of combustible particles and pulverulent release agent is between 2 wt % and 12 wt %.

5. The method according to claim 2, wherein:
   a fraction of $Al(OH)_3$ in the mixture of combustible particles and pulverulent release agent is between 8 wt % and 25 wt %; and
   a fraction of AlO(OH) in the mixture of combustible particles and pulverulent release agent is between 4 wt % and 10 wt %.

6. The method according to claim 2, wherein the pulverulent release agent further contains dehydroxylated kaolin.

7. The method according to claim 3, wherein the pulverulent release agent further contains dehydroxylated kaolin.

8. The method according to claim 4, wherein the pulverulent release agent further contains dehydroxylated kaolin.

9. The method according to claim 5, wherein the pulverulent release agent further contains dehydroxylated kaolin.

10. The method according to claim 6, wherein the fraction of dehydroxylated kaolin in the mixture of combustible particles and pulverulent release agent is between 3 wt % and 10 wt %.

11. The method according to claim 7, wherein the fraction of dehydroxylated kaolin in the mixture of combustible particles and pulverulent release agent is between 3 wt % and 10 wt %.

12. The method according to claim 8, wherein the fraction of dehydroxylated kaolin in the mixture of combustible particles and pulverulent release agent is between 3 wt % and 10 wt %.

13. The method according to claim 9, wherein the fraction of dehydroxylated kaolin in the mixture of combustible particles and pulverulent release agent is between 3 wt % and 10 wt %.

14. The method according to claim 6, wherein the fraction of dehydroxylated kaolin in the mixture of combustible particles and pulverulent release agent is between 4 wt % and 7 wt %.

15. The method according to claim 7, wherein the fraction of dehydroxylated kaolin in the mixture of combustible particles and pulverulent release agent is between 4 wt % and 7 wt %.

16. The method according to claim 8, wherein the fraction of dehydroxylated kaolin in the mixture of combustible particles and pulverulent release agent is between 4 wt % and 7 wt %.

17. The method according to claim 9, wherein the fraction of dehydroxylated kaolin in the mixture of combustible particles and pulverulent release agent is between 4 wt % and 7 wt %.

18. The method according to claim 1, wherein at least 90% of $Al(OH)_3$ particles in the pulverulent release agent have a particle diameter of less than 4 micrometers.

19. The method according to claim 1, wherein at least 90% of $Al(OH)_3$ particles in the pulverulent release agent have a particle diameter of less than 3.5 micrometers.

20. The method according to claim 1, wherein at least 90% of AlO(OH) particles in the pulverulent release agent have a particle diameter of less than 1 micrometer.

21. The method according to claim 1, wherein at least 90% of AlO(OH) particles in the pulverulent release agent have a particle diameter of less than 0.7 micrometer.

22. The method according to claim 4, wherein at least 90% of dehydroxylated kaolin particles in the pulverulent release agent have a particle diameter of less than 5 micrometers.

23. The method according to claim 4, wherein at least 90% of dehydroxylated kaolin particles in the pulverulent release agent have a particle diameter of less than 4 micrometers.

24. The method according to claim 1, which further comprises mixing the combustible particles with the pulverulent release agent in a mixer.

25. The method according to claim 1, wherein the furnace is a rotary tube furnace or a directly heated rotary tube furnace.

26. The method according to claim 1, wherein the furnace is a shaft furnace.

27. The method according to claim 1, which further comprises setting a combustion temperature to a value between 800° C. and 1150° C.

28. The method according to claim 1, which further comprises setting a combustion temperature to a value between 850° C. and 1000° C.

* * * * *